US012277680B2

(12) United States Patent
Arifuku

(10) Patent No.: US 12,277,680 B2
(45) Date of Patent: Apr. 15, 2025

(54) IMAGE PROCESSING APPARATUS, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventor: Hironobu Arifuku, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 18/172,140

(22) Filed: Feb. 21, 2023

(65) Prior Publication Data

US 2023/0274402 A1 Aug. 31, 2023

(30) Foreign Application Priority Data

Feb. 25, 2022 (JP) .................................. 2022-028383

(51) Int. Cl.
*G06T 5/50* (2006.01)
*G06T 5/90* (2024.01)
(Continued)

(52) U.S. Cl.
CPC .................. *G06T 5/50* (2013.01); *G06T 5/90* (2024.01); *G06T 7/70* (2017.01); *G06V 10/60* (2022.01);
(Continued)

(58) Field of Classification Search
CPC .... G06T 5/50; G06T 5/90; G06T 7/70; G06T 2207/10144; G06T 2207/10148; G06V 10/60; G06V 10/761; G06V 2201/07
See application file for complete search history.

(56) References Cited

U.S. PATENT DOCUMENTS 8,805,091 B1 * 8/2014 Hensel .................... G06T 11/60
382/218
9,934,446 B2 4/2018 Yano et al.
(Continued)

FOREIGN PATENT DOCUMENTS

CA 3035710 A1 * 9/2019 ............. G06F 15/18
CN 109583302 A * 4/2019 ........... G06F 18/214
(Continued)

*Primary Examiner* — Ryan R Yang
(74) *Attorney, Agent, or Firm* — Canon U.S.A., Inc. IP Division

(57) ABSTRACT

There is provided an image processing apparatus. An obtainment unit obtains a first image, first subject information indicating a first subject detected from the first image, a second image, and second subject information indicating a second subject detected from the second image. A composition unit generates a composite image by compositing the first image and the second image. A recording unit records one of the first subject information and the second subject information in association with the composite image in a case where a similarity between the first subject information and the second subject information satisfies a predetermined criterion, and records both of the first subject information and the second subject information in association with the composite image in a case where the similarity between the first subject information and the second subject information does not satisfy the predetermined criterion.

13 Claims, 6 Drawing Sheets

(51) Int. Cl.
*G06T 7/70* (2017.01)
*G06V 10/60* (2022.01)
*G06V 10/74* (2022.01)

(52) U.S. Cl.
CPC .. *G06V 10/761* (2022.01); *G06T 2207/10144* (2013.01); *G06T 2207/10148* (2013.01); *G06V 2201/07* (2022.01)

(56) References Cited

U.S. PATENT DOCUMENTS

| 2015/0138386 | A1 |   | 5/2015  | Yano et al. |                |
|--------------|----|---|---------|-------------|----------------|
| 2017/0345200 | A1 | * | 11/2017 | Furuya      | G06T 11/60     |
| 2020/0380748 | A1 | * | 12/2020 | Moussaffi   | G06F 18/22     |
| 2023/0061377 | A1 | * | 3/2023  | Miyuki      | G07G 1/0081    |

FOREIGN PATENT DOCUMENTS

| JP | 2015099559 A | 5/2015 |
| JP | 2019009577 A | 1/2019 |

\* cited by examiner

ANNOTATION INFORMATION

FILE NUMBER: 501
SUBJECT 1
    COORDINATES (x11, y11, w11, h11), TYPE=MOUNTAIN, DETAILS=MT. FUJI
SUBJECT 2
    COORDINATES (x12, y12, w12, h12), TYPE=SKY, DETAILS=NONE
SUBJECT 3
    COORDINATES (x13, y13, w13, h13), TYPE=SLOPED SURFACE, DETAILS=FOREST
SUBJECT 4
    COORDINATES (x14, y14, w14, h14), TYPE=CLOUD, DETAILS=NONE

602

ANNOTATION INFORMATION

FILE NUMBER: 502
SUBJECT 1
    COORDINATES (x21, y21, w21, h21), TYPE=MOUNTAIN, DETAILS=NONE
SUBJECT 2
    COORDINATES (x22, y22, w22, h22), TYPE=SKY, DETAILS=NONE
SUBJECT 3
    COORDINATES (x23, y23, w23, h23), TYPE=SLOPED SURFACE, DETAILS=FOREST
SUBJECT 4
    COORDINATES (x24, y24, w24, h24), TYPE=CLOUD, DETAILS=NONE

603

ANNOTATION INFORMATION

FILE NUMBER: 503
SUBJECT 1
    COORDINATES (x21, y21, w21, h21), TYPE=MOUNTAIN, DETAILS=NONE
SUBJECT 2
    COORDINATES (x22, y22, w22, h22), TYPE=SKY, DETAILS=NONE
SUBJECT 3
    COORDINATES (x13, y13, w13, h13), TYPE=SLOPED SURFACE, DETAILS=FOREST
SUBJECT 4
    COORDINATES (x24, y24, w24, h24), TYPE=CLOUD, DETAILS=NONE

IMAGE PROCESSING APPARATUS, IMAGE CAPTURING APPARATUS, IMAGE PROCESSING METHOD, AND STORAGE MEDIUM

BACKGROUND

Field of the Disclosure

The present disclosure relates to an image processing apparatus, an image capturing apparatus, an image processing method, and a storage medium.

Description of the Related Art

In recent years, artificial intelligence (AI) techniques, such as deep learning, have been utilized in a variety of technical fields. For example, conventionally, digital still cameras and the like are known to have a function to detect a human face from a shot image. Also, Japanese Patent Laid-Open No. 2015-099559 discloses a technique to accurately detect and recognize animals, such as dogs and cats, without limiting a detection target to humans.

Furthermore, there is a known technique whereby a composite image is generated by compositing a plurality of material images, such as HDR composition and multiple composition. In connection to this technique, Japanese Patent Laid-Open No. 2019-009577 discloses that only shooting information of an image including a main subject (a material image) is added to a post-composition image and recorded.

Assume a case where subject information pieces of material images are estimated and recorded using AI techniques and the like, and a composite image is generated by compositing a plurality of material images. In this case, if all subject information pieces of each material image are unconditionally associated with the composite image, there is a possibility that the subject information pieces associated with the composite image will become redundant and the usability of the subject information pieces will decrease, depending on the similarity among the subject information pieces of the material images. However, conventional techniques cannot address this problem.

SUMMARY

The present disclosure has been made in view of the foregoing situation, and provides a technique to associate subject information pieces of each material image with a composite image so as to reduce redundancy of the subject information pieces associated with the composite image.

According to a first aspect of the present disclosure, there is provided an image processing apparatus, comprising: an obtainment unit configured to obtain a first image, first subject information indicating a first subject detected from the first image, a second image, and second subject information indicating a second subject detected from the second image; a composition unit configured to generate a composite image by compositing the first image and the second image; and a recording unit configured to record one of the first subject information and the second subject information in association with the composite image in a case where a similarity between the first subject information and the second subject information satisfies a predetermined criterion, and record both of the first subject information and the second subject information in association with the composite image in a case where the similarity between the first subject information and the second subject information does not satisfy the predetermined criterion.

According to a second aspect of the present disclosure, there is provided an image capturing apparatus, comprising: the image processing apparatus according to the first aspect; and an image capturing unit configured to generate the first image and the second image, wherein the obtainment unit obtains the first image and the second image generated by the image capturing unit.

According to a third aspect of the present disclosure, there is provided an image processing method executed by an image processing apparatus, comprising: obtaining a first image, first subject information indicating a first subject detected from the first image, a second image, and second subject information indicating a second subject detected from the second image; generating a composite image by compositing the first image and the second image; and recording one of the first subject information and the second subject information in association with the composite image in a case where a similarity between the first subject information and the second subject information satisfies a predetermined criterion, and recording both of the first subject information and the second subject information in association with the composite image in a case where the similarity between the first subject information and the second subject information does not satisfy the predetermined criterion.

According to a fourth aspect of the present disclosure, there is provided a non-transitory computer-readable storage medium which stores a program for causing a computer to execute an image processing method comprising: obtaining a first image, first subject information indicating a first subject detected from the first image, a second image, and second subject information indicating a second subject detected from the second image; generating a composite image by compositing the first image and the second image; and recording one of the first subject information and the second subject information in association with the composite image in a case where a similarity between the first subject information and the second subject information satisfies a predetermined criterion, and recording both of the first subject information and the second subject information in association with the composite image in a case where the similarity between the first subject information and the second subject information does not satisfy the predetermined criterion.

Further features of the present disclosure will become apparent from the following description of exemplary embodiments with reference to the attached drawings.

BRIEF DESCRIPTION OF THE DRAWINGS

FIG. 6 is a diagram showing examples of annotation information recorded in a material image file and an HDR composite image file.

DESCRIPTION OF THE EMBODIMENTS

Figure 1:
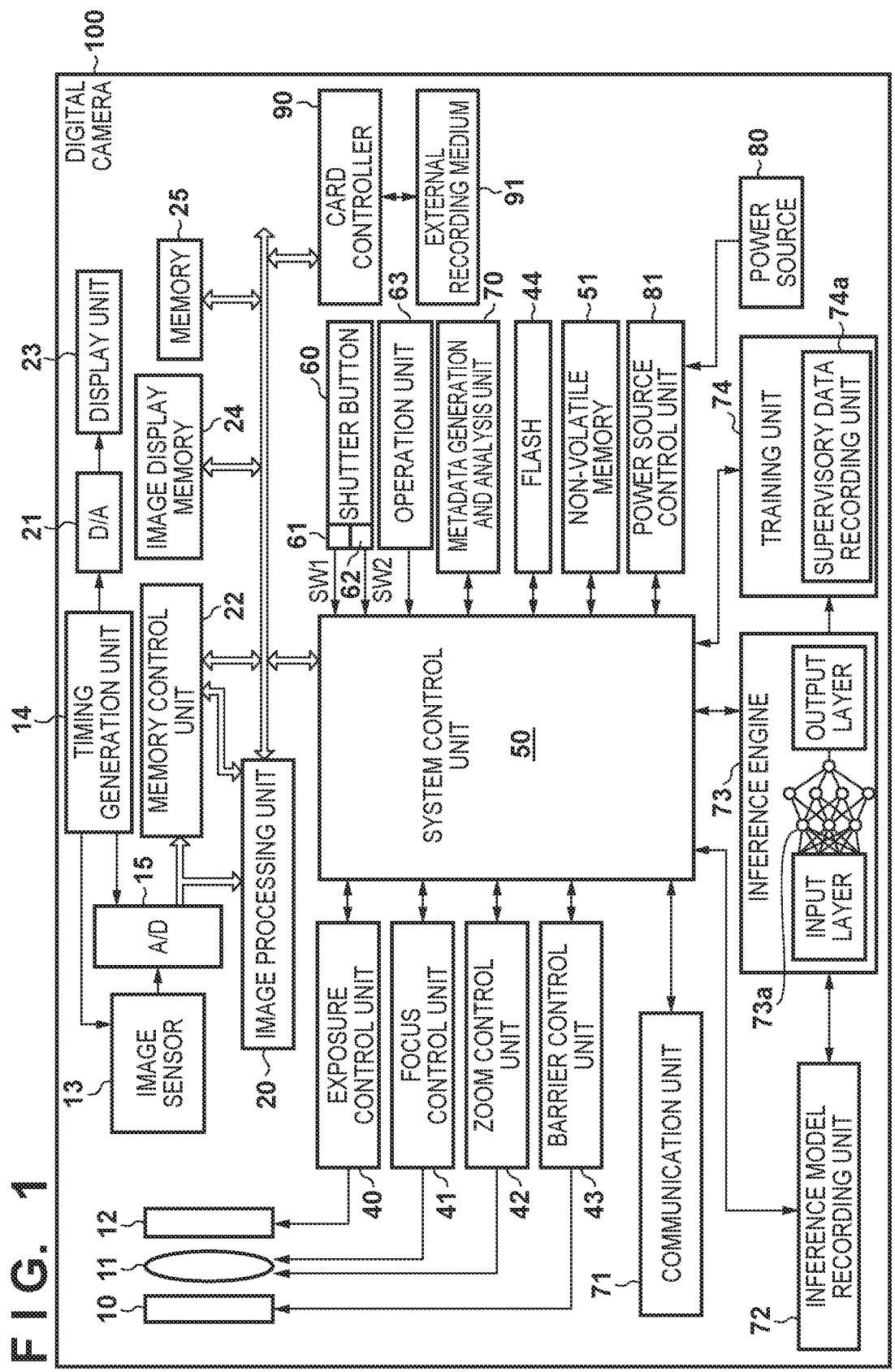
FIG. 1 is a block diagram showing an exemplary configuration of a digital camera 100.

Hereinafter, embodiments will be described in detail with reference to the attached drawings. Note, the following embodiments are not intended to limit the scope of every embodiment. Multiple features are described in the embodiments, but limitation is not made to an embodiment that requires all such features, and multiple such features may be combined as appropriate. Furthermore, in the attached drawings, the same reference numerals are given to the same or similar configurations, and redundant description thereof is omitted.

Furthermore, the following description exemplarily presents a digital camera (an image capturing apparatus) as an image processing apparatus that performs subject classification with use of an inference model. However, in the following embodiments, the image processing apparatus is not limited to a digital camera. The image processing apparatus according to the following embodiments may be any apparatus as long as it is an apparatus that has digital camera functions to be described below, and may be, for example, a smartphone, a tablet PC, or the like.

First Embodiment

Configuration of Digital Camera 100

FIG. 1 is a block diagram showing an exemplary configuration of a digital camera 100. A barrier 10 is a protection member that covers an image capturing unit of the digital camera 100, including a photographing lens 11, thereby preventing the image capturing unit from being stained or damaged. The operations of the barrier 10 are controlled by a barrier control unit 43. The photographing lens 11 causes an optical image to be formed on an image capturing surface of an image sensor 13. A shutter 12 has a diaphragm function. The image sensor 13 is composed of, for example, a CCD or CMOS sensor or the like, and converts the optical image that has been formed on the image capturing surface by the photographing lens 11 via the shutter 12 into electrical signals.

An A/D converter 15 converts analog image signals output from the image sensor 13 into digital image signals. The digital image signals converted by the A/D converter 15 are written to a memory 25 as so-called RAW image data pieces. In addition to this, development parameters corresponding to respective RAW image data pieces are generated based on information at the time of shooting, and written to the memory 25. Development parameters are composed of various types of parameters that are used in image processing for recording images using a JPEG method or the like, such as an exposure setting, white balance, color space, and contrast.

A timing generation unit 14 is controlled by a memory control unit 22 and a system control unit 50, and supplies clock signals and control signals to the image sensor 13, the A/D converter 15, and a D/A converter 21.

An image processing unit 20 executes various types of image processing, such as predetermined pixel interpolation processing, color conversion processing, correction processing, resize processing, and image composition processing, with respect to data from the A/D converter 15 or data from the memory control unit 22. Also, the image processing unit 20 executes predetermined image processing and computation processing with use of image data obtained through image capture, and provides the obtained computation result to the system control unit 50. The system control unit 50 realizes AF (autofocus) processing, AE (automatic exposure) processing, and EF (preliminary flash emission) processing by controlling an exposure control unit 40 and a focus control unit 41 based on the provided computation result.

In the present embodiment, the system control unit 50 can perform shooting under two exposure settings that differ from each other in exposure. The first exposure setting is "appropriate exposure setting", which allows an appropriately-exposed image to be obtained as a result of the system control unit 50 providing the exposure control unit 40 with a feedback of the result of AE (automatic exposure) processing. The second exposure setting is "underexposure setting", which allows an image with a dark exposure to be obtained as a result of the system control unit 50 providing the exposure control unit 40 with a feedback of the result of the AE (automatic exposure) processing to which an offset for reducing exposure has been given.

Furthermore, the image processing unit 20 executes predetermined computation processing with use of image data obtained through image capture, and also executes AWB (auto white balance) processing based on the obtained computation result. In addition, the image processing unit 20 reads in image data stored in the memory 25, and executes compression processing or decompression processing with use of such methods as a JPEG method, an MPEG-4 AVC method, an HEVC (High Efficiency Video Coding) method, and a lossless compression method for uncompressed RAW data. Then, the image processing unit 20 writes the image data for which processing has been completed to the memory 25.

Also, the image processing unit 20 executes predetermined computation processing with use of image data obtained through image capture, and executes editing processing with respect to various types of image data. For example, the image processing unit 20 can execute trimming processing in which the display range and size of an image is adjusted by causing unnecessary portions around image data not to be displayed, and resize processing in which the size is changed by enlarging or reducing image data, display elements of a screen, and the like. Furthermore, the image processing unit 20 can execute RAW development whereby image data is generated by applying image processing, such as color conversion, to data that has undergone compression processing or decompression processing with use of a lossless compression method for uncompressed RAW data, and converting the resultant data into a JPEG format. Moreover, the image processing unit 20 can execute moving image cutout processing in which a designated frame of a moving image format, such as MPEG-4, is cut out, converted into a JPEG format, and stored.

Also, the image processing unit 20 includes a composition processing circuit that composites a plurality of image data pieces. The image processing unit 20 can execute addition composition processing, weighted addition composition processing, and region designation composition processing. The region designation composition processing is processing to designate a region to be used for composition on a per-material-image basis and composite the designated region of each material image.

Furthermore, the image processing unit 20 also executes, for example, processing for causing OSD (On-Screen Display), such as a menu to be displayed on a display unit 23 and no particular characters, to be superimposed on image data to be displayed.

In addition, the image processing unit 20 executes subject detection processing for detecting a subject that exists within image data and detecting a subject region thereof with use of, for example, input image data and information of a distance to the subject at the time of shooting, which is obtained from, for example, the image sensor 13. Examples of detectable information (subject detection information)

include information of the position, size, inclination, and the like of a subject region within an image, and information indicating certainty.

The memory control unit 22 controls the A/D converter 15, the timing generation unit 14, the image processing unit 20, an image display memory 24, the D/A converter 21, and the memory 25. RAW image data generated by the A/D converter 15 is written to the image display memory 24 or the memory 25 via the image processing unit 20 and the memory control unit 22, or directly via the memory control unit 22.

Image data for display that has been written to the image display memory 24 is displayed on the display unit 23, which is composed of a TFT LCD or the like, via the D/A converter 21. An electronic viewfinder function for displaying live images can be realized by sequentially displaying image data pieces obtained through image capture with use of the display unit 23.

The memory 25 has a storage capacity that is sufficient to store a predetermined number of still images and moving images of a predetermined length of time, and stores still images and moving images that have been shot. Furthermore, the memory 25 can also be used as a working area for the system control unit 50.

The exposure control unit 40 controls the shutter 12, which has a diaphragm function. Furthermore, the exposure control unit 40 also exerts a flash light adjustment function by operating in coordination with a flash 44. The focus control unit 41 performs focus adjustment by driving a non-illustrated focus lens included in the photographing lens 11 based on an instruction from the system control unit 50. A zoom control unit 42 controls zooming by driving a non-illustrated zoom lens included in the photographing lens 11. The flash 44 has a function of emitting AF auxiliary light, and a flash light adjustment function.

The system control unit 50 controls the entirety of the digital camera 100. A non-volatile memory 51 is an electrically erasable and recordable non-volatile memory; for example, an EEPROM or the like is used thereas. Note that not only programs, but also map information and the like are recorded in the non-volatile memory 51.

A shutter switch 61 (SW1) is turned ON and issues an instruction for starting operations of AF processing, AE processing, AWB processing, EF processing, and the like in the midst of an operation on a shutter button 60. A shutter switch 62 (SW2) is turned ON and issues an instruction for starting a series of shooting operations, including exposure processing, development processing, and recording processing, upon completion of the operation on the shutter button 60. In the exposure processing, signals that have been read out from the image sensor 13 are written to the memory 25 as RAW image data via the A/D converter 15 and the memory control unit 22. In the development processing, the image processing unit 20 and the memory control unit 22 perform computation to develop RAW image data that has been written to the memory 25 and write the same to the memory 25 as image data. In the recording processing, image data is read out from the memory 25, the image data is compressed by the image processing unit 20, the compressed image data is stored to the memory 25, and then the stored image data is written to an external recording medium 91 via a card controller 90.

An operation unit 63 includes such operation members as various types of buttons and a touchscreen. For example, the operation unit 63 includes a power button, a menu button, a mode changing switch for switching among a shooting mode, a reproduction mode, and other special shooting modes, directional keys, a set button, a macro button, and a multi-screen reproduction page break button. Also, for example, the operation unit 63 includes a flash setting button, a button for switching among single shooting, continuous shooting, and self-timer, a menu change+(plus) button, a menu change—(minus) button, a shooting image quality selection button, an exposure correction button, a date/time setting button, and so forth.

When image data is to be recorded in the external recording medium 91, a metadata generation and analysis unit 70 generates various types of metadata, such as information of the Exif (Exchangeable image file format) standard to be attached to the image data, based on information at the time of shooting. Also, when image data recorded in the external recording medium 91 has been read in, the metadata generation and analysis unit 70 analyzes metadata added to the image data. Examples of metadata include shooting setting information at the time of shooting, image data information related to image data, feature information of a subject included in image data, and so forth. Furthermore, when moving image data is to be recorded, the metadata generation and analysis unit 70 can also generate and add metadata with respect to each frame.

A power source 80 includes, for example, a primary battery such as an alkaline battery and a lithium battery, a secondary battery such as a NiCd battery, a NiMH battery, and a Li battery, or an AC adapter. A power source control unit 81 supplies power supplied from the power source 80 to each component of the digital camera 100.

The card controller 90 transmits/receives data to/from the external recording medium 91, such as a memory card. The external recording medium 91 is composed of, for example, a memory card, and images (still images and moving images) shot by the digital camera 100 are recorded therein.

Using an inference model recorded in an inference model recording unit 72, an inference engine 73 performs inference with respect to image data that has been input via the system control unit 50. The system control unit 50 can record an inference model that has been input from an external apparatus (not shown) via a communication unit 71 in the inference model recording unit 72. Also, the system control unit 50 can record, in the inference model recording unit 72, an inference model that has been obtained by re-training the inference model with use of a training unit 74. Note, there is a possibility that an inference model recorded in the inference model recording unit 72 is updated due to inputting of an inference model from an external apparatus, or re-training of an inference model with use of the training unit 74. For this reason, the inference model recording unit 72 holds version information so that the version of an inference model can be identified.

Also, the inference engine 73 includes a neural network design 73a. The neural network design 73a is configured in such a manner that intermediate layers (neurons) are arranged between an input layer and an output layer. The system control unit 50 inputs image data to the input layer. Neurons in several layers are arranged as the intermediate layers. The number of layers of neurons is determined as appropriate in terms of design. Furthermore, the number of neurons in each layer is also determined as appropriate in terms of design. In the intermediate layers, weighting is performed based on an inference model recorded in the inference model recording unit 72. An inference result corresponding to the image data input to the input layer is output to the output layer.

It is assumed that, in the present embodiment, an inference model recorded in the inference model recording unit 72 is an inference model that infers classification, that is to say, what kind of subject is included in an image. An inference model is used that has been generated through deep learning while using image data pieces of various subjects, as well as the result of classification thereof (e.g., classification of animals such as dogs and cats, classification of subject types such as humans, animals, plants, and buildings, and so forth), as supervisory data. Therefore, when an image has been input, together with information indicating a region of a subject that has been detected in this image, to the inference engine 73 that uses the inference model, an inference result indicating classification (type) of this subject is output.

Upon receiving a request from the system control unit 50 or the like, the training unit 74 re-trains an inference model. The training unit 74 includes a supervisory data recording unit 74a. Information related to supervisory data for the inference engine 73 is recorded in the supervisory data recording unit 74a. The training unit 74 can cause the inference engine 73 to be re-trained with use of the supervisory data recorded in the supervisory data recording unit 74a, and update the inference engine 73 with use of the inference model recording unit 72.

The communication unit 71 includes a communication circuit for performing transmission and reception. Communication performed by the communication circuit specifically may be wireless communication via Wi-Fi, Bluetooth®, or the like, or may be wired communication via Ethernet, a USB, or the like.

HDR Shooting Processing and HDR Composition Processing

Figure 2:
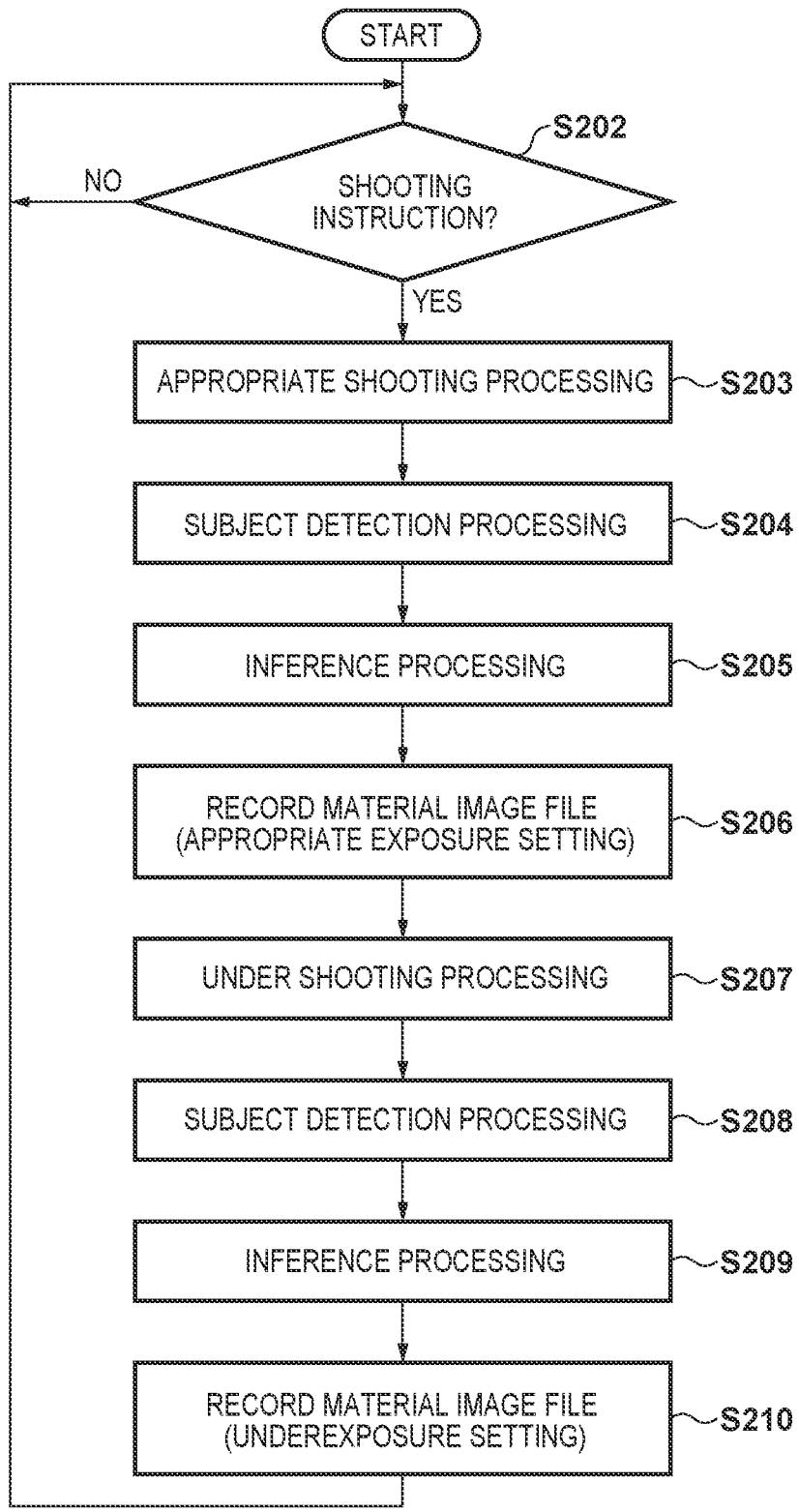
FIG. 2 is a flowchart of HDR shooting processing executed by the digital camera 100.

Next, HDR shooting processing and HDR composition processing executed by the digital camera 100 will be described with reference to FIG. 2 to FIG. 6. FIG. 2 is a flowchart of the HDR shooting processing executed by the digital camera 100. Processing of each step in the present flowchart is realized by the system control unit 50 of the digital camera 100 controlling respective constituent elements of the digital camera 100 in accordance with a program, unless specifically stated otherwise. When the operation mode of the digital camera 100 has been set to an HDR shooting mode, the HDR shooting processing of the present flowchart is started. Note that a user can set the operation mode of the digital camera 100 to the HDR shooting mode by causing a menu screen to be displayed on the display unit 23 via an operation on the operation unit 63 and selecting the HDR shooting mode on the menu screen.

In step S202, the system control unit 50 determines whether the user has issued a shooting instruction. The user can issue the shooting instruction by depressing the shutter button 60, thereby turning ON the shutter switches 61 (SW1) and 62 (SW2). The system control unit 50 repeats determination processing in step S202 until the user issues the shooting instruction. Once the user has issued the shooting instruction, processing steps proceed to step S203.

In step S203, the system control unit 50 executes shooting processing under the appropriate exposure setting (appropriate shooting processing). In the appropriate shooting processing, the system control unit 50 executes AF (autofocus) processing and AE (automatic exposure) processing using the focus control unit 41 and the exposure control unit 40, and then stores image signals that are output from the image sensor 13 via the A/D converter 15 into the memory 25. At this time, the system control unit 50 performs control to obtain an appropriately-exposed image by providing the exposure control unit 40 with a feedback of the result of the AE (automatic exposure) processing under the appropriate exposure setting. Also, the image processing unit 20 generates image data of a format conforming to a user setting (e.g., a JPEG format) by executing compression processing conforming to the user setting with respect to the image signals stored in the memory 25, and stores the generated image data into the memory 25.

In step S204, the image processing unit 20 executes subject detection processing with respect to the image signals stored in the memory 25, and obtains information of subjects included in the image (subject detection information).

In step S205, with use of the inference engine 73, the system control unit 50 executes inference processing with respect to the subjects that were detected from the image signals (material image) stored in the memory 25. The system control unit 50 specifies subject regions within the image based on the image signals stored in the memory 25 and on the subject detection information obtained in step S204. The system control unit 50 inputs the image signals (material image), as well as information indicating the subject regions in the material image, to the inference engine 73. An inference result indicating classification (type) of the subjects included in the subject regions is output as the result of execution of the inference processing by the inference engine 73 for each subject region. Note that the inference engine 73 may output information related to the inference processing, such as debug information and logs associated with the operations of the inference processing, in addition to the inference result.

In step S206, the system control unit 50 records a file including the image data generated in step S203, the subject detection information obtained in step S204, and the inference result obtained in step S205 as a material image file for HDR composition into the external recording medium 91.

Figure 3:
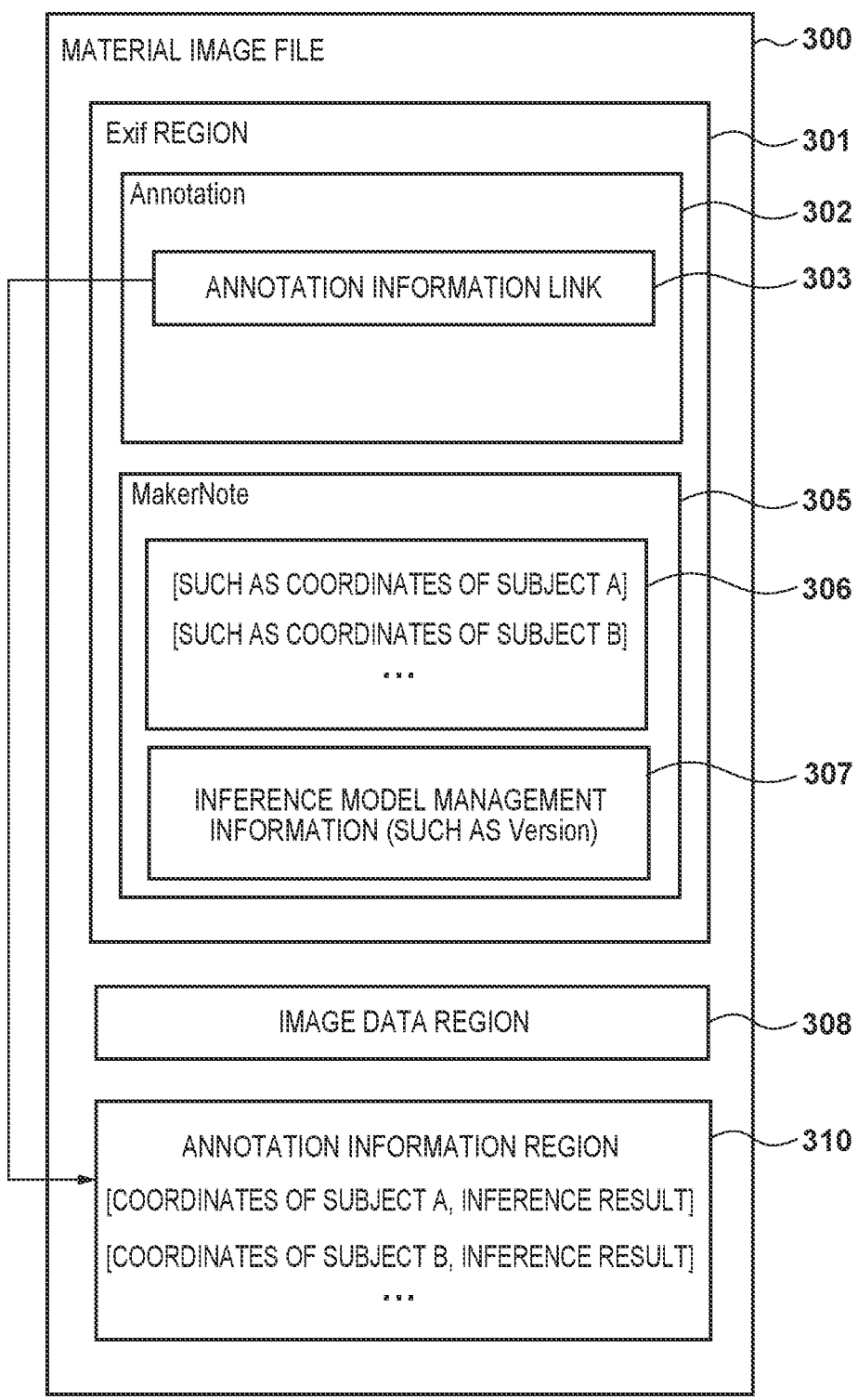
FIG. 3 is a diagram showing an exemplary configuration of a material image file.

FIG. 3 is a diagram showing an exemplary configuration of a material image file. As shown in FIG. 3, a material image file 300 is divided into a plurality of storage regions, and includes an Exif region 301 for storing metadata conforming to the Exif standard, as well as an image data region 308 in which compressed image data is recorded. Furthermore, the material image file 300 also includes an annotation information region 310 in which annotation information is recorded. In a case where the material image file 300 is a file of a JPEG format, each of the plurality of storage regions is defined by a marker. For example, in a case where the user has issued an instruction for recording images in the JPEG format, the material image file 300 is recorded in the JPEG format. In this case, the image data generated in step S203 is recorded in the image data region 308 in the JPEG format, and information of the Exif region 301 is recorded in a region defined by, for example, an APP1 marker or the like. Also, information of the annotation information region 310 is recorded in a region defined by, for example, an APP11 marker or the like. In a case where the user has issued an instruction for recording images in an HEIF (High Efficiency Image File Format) format, the material image file 300 is recorded in an HEIF file format. In this case, information of the Exif region 301 and the annotation information region 310 is recorded in, for example, a Metadata Box. Also in a case where the user has issued an instruction for recording images in a RAW format, information of the Exif region 301 and the annotation information region 310 is similarly recorded in a predetermined region, such as a Metadata Box.

The metadata generation and analysis unit 70 records the subject detection information obtained in step S204 into a subject detection information tag 306 within a MakerNote 305 (a region in which metadata unique to a maker can be described in a basically-undisclosed form) included in the Exif region 301. Also, in a case where there are version information of the current inference model recorded in the inference model recording unit 72, debug information output from the inference engine 73 in step S205, and so forth, these pieces of information are recorded inside the Maker-Note 305 as inference model management information 307.

The inference result obtained in step S205 is recorded in the annotation information region 310 as annotation information. The location of the annotation information region 310 is indicated by an annotation information link 303 included in an annotation link information storage tag 302. In the present embodiment, it is assumed that annotation information is described in a text format, such as XML and JSON.

Returning to FIG. 2, in step S207, the system control unit 50 executes shooting processing under the underexposure setting (under shooting processing). In the under shooting processing, the system control unit 50 executes processing similar to that of step S203, but performs control to obtain an image with a dark exposure by providing the exposure control unit 40 with a feedback of the result of the AE (automatic exposure) processing under the underexposure setting. Also, similarly to step S203, the system control unit 50 generates image data of a format conforming to a user setting (e.g., a JPEG format), and stores the generated image data into the memory 25.

In step S208, by way of processing similar to that of step S204, the image processing unit 20 obtains information of subjects included in the image obtained through the under shooting processing (subject detection information).

In step S209, by way of processing similar to that of step S205, the system control unit 50 obtains inference results related to the subjects included in the image signals (material images) obtained through the under shooting processing.

In step S210, similarly to step S206, the system control unit 50 records a file including the image data generated in step S207, the subject detection information obtained in step S208, and the inference results obtained in step S209, as a material image file for HDR composition, into the external recording medium 91.

Thereafter, the processing step returns to step S202; when the next shooting instruction is issued, the system control unit 50 executes processing of step S203 onward again.

Figure 5:
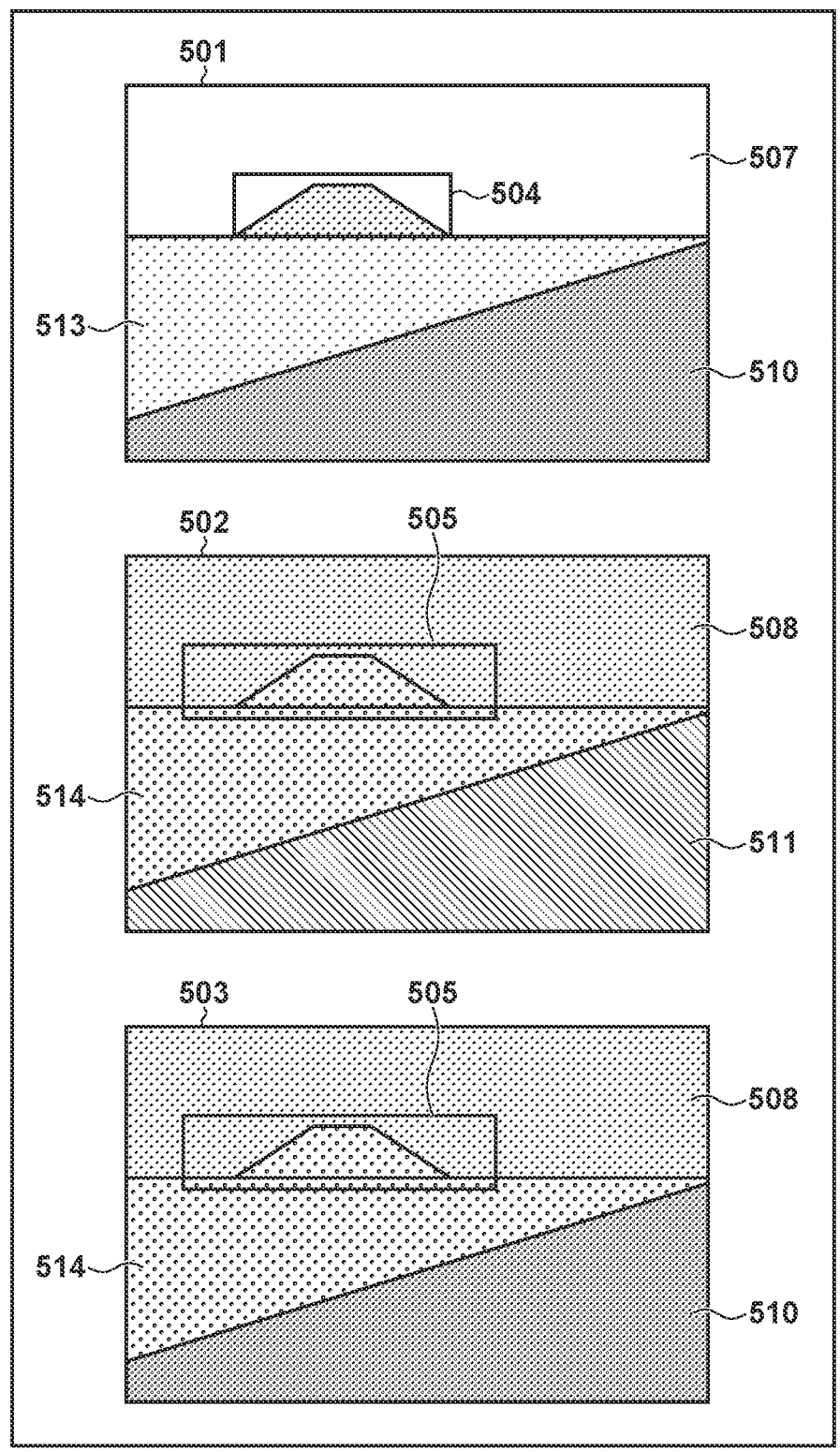
FIG. 5 is a diagram showing examples of a material image and an HDR composite image.

With reference to FIG. 5, examples of material images obtained through the HDR shooting processing of FIG. 2 will be described. A material image 501 is an image generated through the appropriate shooting processing. Inference results corresponding to a mountain 504, the sky 507, a sloped surface 510, and a cloud 513 have been obtained through the inference processing for the material image 501. A material image 502 is an image generated through the under shooting processing. Inference results corresponding to a mountain 505, the sky 508, a sloped surface 511, and a cloud 514 have been obtained through the inference processing for the material image 502. The inference results for to the material image 501 are recorded in a material image file as annotation information 601 shown in FIG. 6, and the inference results for the material image 502 are recorded in a material image file as annotation information 602 shown in FIG. 6. As shown in FIG. 6, annotation information includes, for each subject, an inference result including information indicating a region and a type of the subject (subject information indicating the subject).

Figure 4:
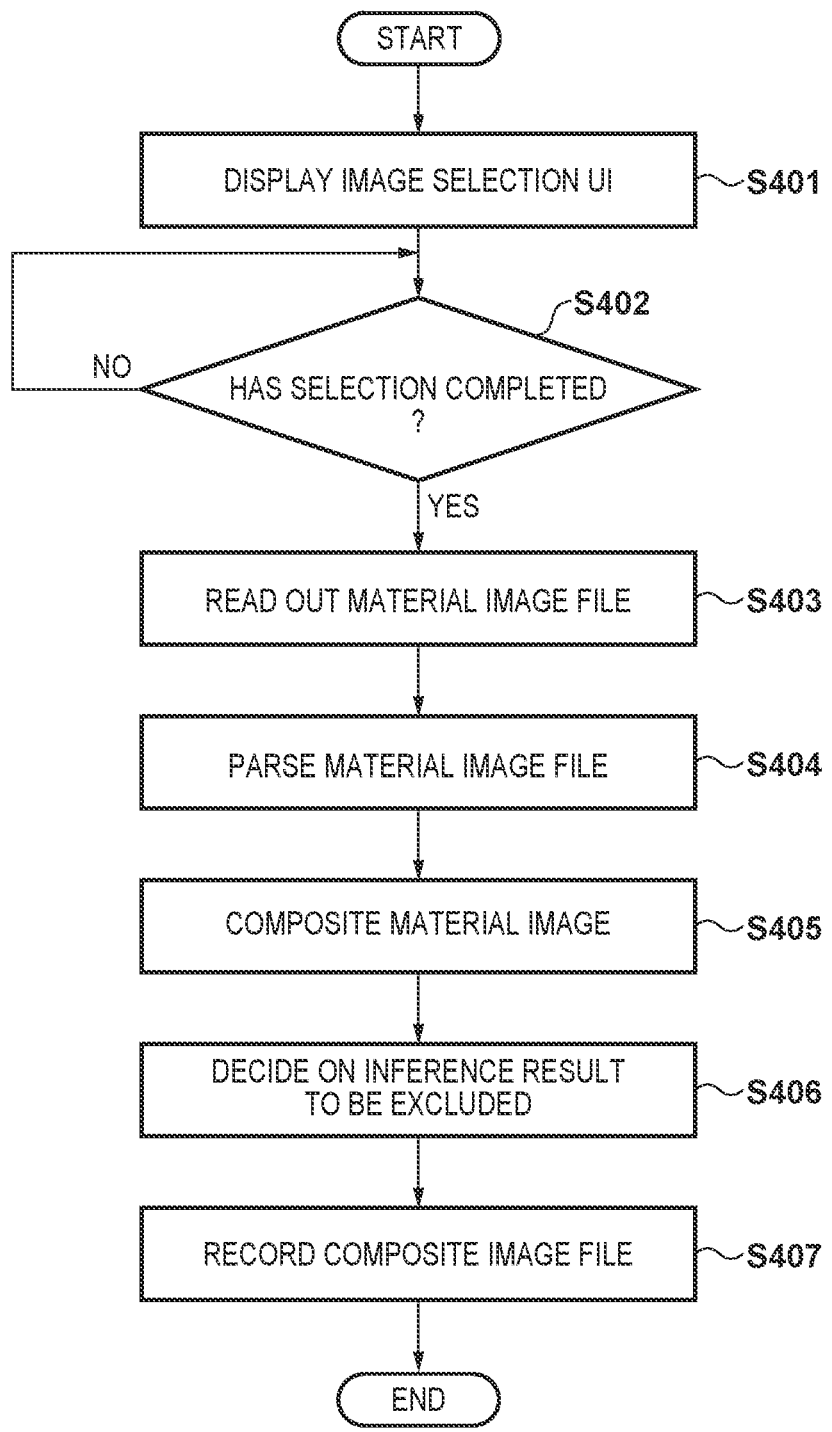
FIG. 4 is a flowchart of HDR composition processing executed by the digital camera 100.

Next, with reference to FIG. 4, the HDR composition processing will be described. Processing of each step in the present flowchart is realized by the system control unit 50 of the digital camera 100 controlling respective constituent elements of the digital camera 100 in accordance with a program, unless specifically stated otherwise. When the operation mode of the digital camera 100 has been set to an HDR composition mode, the HDR composition processing of the present flowchart is started. Note that a user can set the operation mode of the digital camera 100 to the HDR composition mode by causing a menu screen to be displayed on the display unit 23 via an operation on the operation unit 63 and selecting the HDR composition mode on the menu screen.

In step S401, the system control unit 50 displays, on the display unit 23, a user interface for a user to select material images for the HDR composition processing (an image selection UI). The image selection UI displays, for example, a thumbnail of a material image that has been generated through the appropriate shooting processing. The user can select the material image displayed as the thumbnail by operating the operation unit 63. When the material image has been selected on the image selection UI, a material image that has been generated through the under shooting processing in correspondence with the selected material image is also selected as a material image for the HDR composition processing.

Note, it is assumed that two material image files that are generated through the appropriate shooting processing and the under shooting processing included in single HDR shooting processing are mutually associated in some way. As one example, the two material image files can be mutually associated by including, in the two material image files, a unique character string shared between file names as identification information.

In step S402, the system control unit 50 determines whether the user has completed the selection of material images. The system control unit 50 repeats the determination processing in step S402 until the user completes the selection of material images. Once the user has completed the selection of material images, the processing step proceeds to step S403.

In step S403, the system control unit 50 reads out material image files corresponding to the material images selected in step S402 from the external recording medium 91, and stores the material image files into the memory 25.

In step S404, the system control unit 50 parses (analyzes) the material image files that were stored into the memory 25 in step S403, and extracts image data (the material images), subject detection information pieces, and inference results.

In step S405, the image processing unit 20 composites two material images obtained in step S404, thereby generating an HDR composite image with an expanded luminance dynamic range. Here, any composition method existing in the technical fields for generating an HDR composite image through image composition can be used as a composition method. As one example, based on comparison of luminance between corresponding positions in the two material images, the image processing unit 20 determines which material image includes appropriately-exposed pixels on a per-pixel basis. Then, the image processing unit 20 generates an HDR composite image by compositing the appropriately-exposed pixels included in the two material images. The generated HDR composite image is stored into the memory 25.

An HDR composite image 503 of FIG. 5 is an example of the HDR composite image generated in step S405. In this example, with respect to the sloped surface 510, pixels of the sloped surface 510 included in the material image 501 are composited, whereas with respect to the mountain 505, the sky 508, and the cloud 514, pixels of the mountain 505, the sky 508, and the cloud 514 included in the material image 502 are composited.

In step S406, the system control unit 50 decides on an inference result to be excluded from the targets to be recorded. Specifically, the system control unit 50 identifies inference results that are similar between the two material images. For example, in the case of the material images 501 and 502 shown in FIG. 5, each of pairs of the mountains 504 and 505, the skies 507 and 508, the sloped surfaces 510 and 511, and the clouds 513 and 514, is identified as the inference results that are similar between the material image 501 and the material image 502. In a case where two inference results (e.g., the mountains 504 and 505) are similar between the two material images, recording both of them in association with the HDR composite image causes the HDR composite image to include redundant inference results, which reduces the usability for the user. In view of this, in a case where two inference results (e.g., the mountains 504 and 505) are similar between the two material images, the system control unit 50 excludes one of them from the targets to be recorded.

A description is now given of an example of a method of identifying inference results that are similar between the two material images. The system control unit 50 determines whether the similarity between the inference result for one material image (e.g., the mountain 504) and the inference result for the other material image (the mountain 505) satisfies a predetermined criterion. In a case where this predetermined criterion concerning the similarity is satisfied, the system control unit 50 can identify these two inference results as the inference results that are similar between the two material images. Although the predetermined criterion concerning the similarity is not limited in particular, a criterion based on the degree of overlap between subject regions can be used as one example. For example, in a case where the degree of overlap between a region of a subject specified by the inference result for one material image (e.g., a rectangular region of the mountain 504 specified by the coordinates (x11, y11, w11, h11) included in the annotation information 601) and a region of a subject specified by the inference result for another material image (e.g., a rectangular region of the mountain 505 specified by the coordinates (x21, y21, w21, h21) included in the annotation information 602) is equal to or higher than a predetermined degree, the system control unit 50 determines that the similarity between these two inference results satisfies the predetermined criterion.

Next, two examples will be described in relation to the method of deciding on an inference result to be excluded from the targets to be recorded. For the sake of explanation, focus is placed on the mountains 504 and 505 as the inference results that are similar between the two material images.

As a first example, the system control unit 50 determines whether the HDR composite image includes more components derived from the mountain 504, or more components derived from the mountain 505. In a case where the HDR composite image includes more components derived from the mountain 504 than components derived from the mountain 505, it is considered that the exposure for the mountain 504 is more appropriate than that for the mountain 505, and the inference result for the mountain 504 is more reliable or important than the inference result for the mountain 505. Consequently, the system control unit 50 excludes the mountain 505 (that is to say, the mountain 504 is recorded). Conversely, in a case where the HDR composite image includes more components derived from the mountain 505 than components derived from the mountain 504, the system control unit 50 excludes the mountain 504 (that is to say, the mountain 505 is recorded).

As a second example, the system control unit 50 decides on an inference result excluded from the targets to be recorded based on the degrees of detail of the subject types indicated by the inference results. As indicated by the annotation information 601 of FIG. 6, the inference result for each subject includes information indicating a subject type. Also, there are cases where the information indicating the subject type includes more detailed information related to that type. With regard to "subject 1" corresponding to the mountain 504 in the annotation information 601, there is information indicating that the type is a mountain, and more specifically, Mount Fuji. On the other hand, with regard to "subject 1" corresponding to the mountain 505 in the annotation information 602, although there is information indicating that the type is a mountain, more specific information does not exist. Accordingly, the system control unit 50 excludes an inference result in which information indicating a subject type is not relatively detailed, so that an inference result in which information indicating a subject type is more specific is recorded. Therefore, with regard to the mountain 504 and the mountain 505, the inference result corresponding to the mountain 505 is excluded.

Note that it is permissible to adopt a configuration in which a similar inference result is not excluded in a case where some sort of condition is satisfied. For example, in a case where the two material images have been shot in a predetermined shooting mode, the system control unit 50 does not exclude an inference result regardless of whether the inference results are similar (therefore, for example, both of the mountains 504 and 505 are recorded). The predetermined shooting mode is, for example, a night view mode. As has been described in connection with the aforementioned first example related to the method of deciding on an inference result excluded from the targets to be recorded, it is generally considered that an inference result for a subject detected in an inappropriately-exposed region is of low reliability or importance. However, in the case of the night view mode, there is a possibility that an inference result for a subject detected in an underexposed region will be important to the user. For this reason, in a case where the two material images have been shot in the night view mode, the system control unit 50 does not exclude an inference result regardless of whether the inference results are similar.

In step S407, the system control unit 50 records the HDR composite image generated in step S405, as well as the inference results for each material image (except for the inference result that was excluded in step S406), into the external recording medium 91 as an HDR composite image file. Also, the system control unit 50 includes the subject detection information pieces corresponding to the recorded inference results (obtained in steps S204 and S209 of FIG. 2) in the HDR composite image file. A configuration similar to the configuration of the material image file that has been described with reference to FIG. 3 can be used as a configuration of the HDR composite image file.

Annotation information 603 of FIG. 6 is an example of annotation information included in the HDR composite image file generated in step S407 (i.e., the inference results recorded in association with the HDR composite image). As can be understood from comparison with the annotation information pieces 601 and 602 corresponding to the material images 501 and 502, the annotation information 603 corresponds to a case where the aforementioned first example has been used as the method of deciding on an inference result to be excluded from the targets to be recorded.

Exemplary Modifications Related to Shooting Processing and Composition Processing The foregoing description has been provided under the assumption that the two material images that are composited are images shot through shooting processing under different exposure settings (the appropriate exposure setting and the underexposure setting). However, the different exposure settings in the shooting processing according to the present embodiment are not limited to the appropriate exposure setting and the underexposure setting. For example, an overexposure setting may be used instead of the underexposure setting. The overexposure setting allows an image with a bright exposure to be obtained as a result of the system control unit 50 providing the exposure control unit 40 with a feedback of the result of the AE (automatic exposure) processing to which an offset for increasing exposure has been given.

Also, the number of material images that are composited is not limited to two. It is permissible to adopt, for example, a configuration in which three material images are shot under different exposure settings (e.g., the appropriate exposure setting, the underexposure setting, and the overexposure setting), and these three material images are composited.

Furthermore, although the foregoing description has been provided under the assumption that the composition processing for material images is the HDR composition processing (composition processing for expanding the luminance dynamic range), the composition processing according to the present embodiment is not limited to the HDR composition processing, and may be, for example, depth composition processing (composition processing for increasing the depth of field). In this case, the system control unit 50 shoots two (or more) material images under different focusing distance settings, instead of shooting two (or more) material images under different exposure settings.

As described above, according to the first embodiment, the digital camera 100 obtains a plurality of material images (e.g., the material image 501 and the material image 502) and subject information pieces indicating the subjects detected in each material image (e.g., information pieces of the respective subjects in the annotation information pieces 601 and 602). Furthermore, the digital camera 100 generates a composite image (e.g., the HDR composite image 503) by compositing the plurality of material images. Then, the digital camera 100 records the subject information pieces in association with the composite image. At the time of this recording, in a case where the similarity between subject information of one material image (first subject information) and subject information of another material image (second subject information) satisfies the predetermined criterion, the digital camera 100 records one of the first subject information and the second subject information. In this way, redundancy of subject information (an inference result) associated with the composite image is reduced, and the usability of the subject information (inference result) is improved for a user.

OTHER EMBODIMENTS

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-028383, which was filed on Feb. 25, 2022 and which is hereby incorporated by reference herein in its entirety.

What is claimed is:

1. An image processing apparatus, comprising:
   one or more memories; and
   one or more processors that are in communication with the one or more memories, wherein the one or more processors and the one or more memories are configured to:
   obtain a first image, first subject information indicating a first subject detected from the first image, a second image, and second subject information indicating a second subject detected from the second image;
   generate a composite image by compositing the first image and the second image; and
   record one of the first subject information and the second subject information in association with the composite image in a case where a similarity between the first subject information and the second subject information satisfies a predetermined criterion, and record both of the first subject information and the second subject information in association with the composite image in a case where the similarity between the first subject information and the second subject information does not satisfy the predetermined criterion.

2. The image processing apparatus according to claim 1, wherein
   the similarity between the first subject information and the second subject information satisfies the predetermined criterion in a case where a degree of overlap between a region of the first subject specified by the first subject information and a region of the second subject specified by the second subject information is equal to or higher than a predetermined degree.

3. The image processing apparatus according to claim 1, wherein, in a case where the similarity between the first subject information and the second subject information satisfies the predetermined criterion, the one or more processors and the one or more memories are further configured to
record the first subject information in association with the composite image in a case where the composite image includes more components derived from the first subject than components derived from the second subject, and
record the second subject information in association with the composite image in a case where the composite image includes more components derived from the second subject than components derived from the first subject.

4. The image processing apparatus according to claim 1, wherein
the first subject information includes information indicating a type of the first subject,
the second subject information includes information indicating a type of the second subject, and
in a case where the similarity between the first subject information and the second subject information satisfies the predetermined criterion, the one or more processors and the one or more memories are further configured to
record the first subject information in association with the composite image in a case where the information indicating the type of the first subject is more detailed than the information indicating the type of the second subject, and
record the second subject information in association with the composite image in a case where the information indicating the type of the second subject is more detailed than the information indicating the type of the first subject.

5. The image processing apparatus according to claim 1, wherein
the first image and the second image are images that have been shot under different exposure settings, and
the one or more processors and the one or more memories are further configured to composite the first image and the second image so as to expand a luminance dynamic range.

6. The image processing apparatus according to claim 5, wherein
in a case where the first image and the second image have been shot in a predetermined shooting mode, the one or more processors and the one or more memories are further configured to record both of the first subject information and the second subject information in association with the composite image regardless of whether the similarity between the first subject information and the second subject information satisfies the predetermined criterion.

7. The image processing apparatus according to claim 6, wherein
the predetermined shooting mode is a night view mode.

8. The image processing apparatus according to claim 1, wherein
the first image and the second image are images that have been shot under different focusing distance settings, and
the one or more processors and the one or more memories are further configured to composite the first image and the second image so as to increase a depth of field.

9. The image processing apparatus according to claim 1, wherein the one or more processors and the one or more memories are further configured to
detect the first subject from the first image, and detect the second subject from the second image; and
generate the first subject information indicating the first subject detected from the first image, and generate the second subject information indicating the second subject detected from the second image.

10. The image processing apparatus according to claim 9, wherein the one or more processors and the one or more memories are further configured to
generate the first subject information and the second subject information by executing inference processing using an inference model with respect to the first subject detected from the first image and the second subject detected from the second image.

11. An image capturing apparatus, comprising:
the image processing apparatus according to claim 1; and
an image capturing unit configured to generate the first image and the second image,
wherein the one or more processors and the one or more memories are further configured to obtain the first image and the second image generated by the image capturing unit.

12. An image processing method executed by an image processing apparatus, the method comprising:
obtaining a first image, first subject information indicating a first subject detected from the first image, a second image, and second subject information indicating a second subject detected from the second image;
generating a composite image by compositing the first image and the second image; and
recording one of the first subject information and the second subject information in association with the composite image in a case where a similarity between the first subject information and the second subject information satisfies a predetermined criterion, and recording both of the first subject information and the second subject information in association with the composite image in a case where the similarity between the first subject information and the second subject information does not satisfy the predetermined criterion.

13. A non-transitory computer-readable storage medium which stores computer-executable instructions for causing a computer to execute an image processing method comprising:
obtaining a first image, first subject information indicating a first subject detected from the first image, a second image, and second subject information indicating a second subject detected from the second image;
generating a composite image by compositing the first image and the second image; and
recording one of the first subject information and the second subject information in association with the composite image in a case where a similarity between the first subject information and the second subject information satisfies a predetermined criterion, and recording both of the first subject information and the second subject information in association with the composite image in a case where the similarity between the first subject information and the second subject information does not satisfy the predetermined criterion.

* * * * *